(12) United States Patent
Chou

(10) Patent No.: US 8,757,669 B2
(45) Date of Patent: Jun. 24, 2014

(54) RETRACTABLE PIPE ASSEMBLY OF AIR BLOW GUN

(76) Inventor: Wu-Chiao Chou, Taichung (TW)

( * ) Notice: Subject to any disclaimer, the term of this patent is extended or adjusted under 35 U.S.C. 154(b) by 165 days.

(21) Appl. No.: 13/429,127

(22) Filed: Mar. 23, 2012

(65) Prior Publication Data

US 2013/0249206 A1    Sep. 26, 2013

(51) Int. Cl.
   *F16L 27/12*    (2006.01)
(52) U.S. Cl.
   USPC .................. 285/302; 285/298; 403/109.1
(58) Field of Classification Search
   USPC ............... 285/298, 302, 145.1, 145.4, 32; 403/109.1
   See application file for complete search history.

(56) References Cited

U.S. PATENT DOCUMENTS

| | | | | |
|---|---|---|---|---|
| 1,078,129 A | * | 11/1913 | Corrigan et al. | 285/302 |
| 1,833,040 A | * | 11/1931 | Rader | 285/302 |
| 3,284,114 A | * | 11/1966 | McCord, Jr. et al. | 403/370 |
| 3,783,178 A | * | 1/1974 | Philibert et al. | 174/86 |
| 4,071,266 A | * | 1/1978 | Mountford | 285/14 |
| 4,099,670 A | * | 7/1978 | Cole et al. | 239/205 |
| 5,823,578 A | * | 10/1998 | Chiou | 285/38 |
| 6,874,696 B1 | * | 4/2005 | Ericksen et al. | 239/1 |
| 2011/0084481 A1 | * | 4/2011 | Peng | 285/302 |

* cited by examiner

*Primary Examiner* — James Hewitt
(74) *Attorney, Agent, or Firm* — Muncy, Geissler, Olds & Lowe, P.C.

(57) ABSTRACT

A retractable pipe assembly of an air blow gun includes an extension pipe, a lock unit and a blow pipe. The extension pipe has a stepped through hole which has a large diameter part and a small diameter part for insertion of the blow pipe. One end of extension pipe has an inner inclined surface which is inclined inward. The lock unit includes a lock member. The lock member is connected to the extension pipe. An elastic collet and a seal member are provided in the lock member. Because the inner inclined surface of the extension pipe guides the seal member and the elastic collet pushes the seal member, the seal member is deformed to tighten the blow pipe and to seal the extension pipe. The elastic collet can clamp the blow pipe and won't damage the blow pipe.

6 Claims, 8 Drawing Sheets

RETRACTABLE PIPE ASSEMBLY OF AIR BLOW GUN

BACKGROUND OF THE INVENTION

1. Field of the Invention

The present invention relates to a retractable pipe assembly of an air blow gun, and more particularly to a retractable pipe which can be adjusted in a stepless way and connected with more pipe assemblies.

2. Description of the Prior Art

As shown in FIG. 8 and FIG. 9, a conventional retractable pipe of an air blow gun comprises an extension pipe 50. One end of the extension pipe 50 is connected to an air blow gun 5. The extension pipe 50 has an end head 51 at the other end thereof. A washer 61 and an O-shaped ring 62 are provided in the end head 51 of the extension pipe 50. The distal end of the end head 51 is provided with an O-shaped ring 63 and connected with a metallic sleeve 70. The sleeve 70 comprises an elastic collet 71 at a front end thereof to connect with a nut 72. A pipe 80 has one end inserted into the extension pipe 50 and passing the washer 61 and the O-shaped ring 62. The distal end of the pipe 80 is connected with a stop ring 81. The pipe 80 is movable in the extension pipe 50 and can be secured by screwing the nut 72, achieving retraction and extension of the pipe 80.

As shown in FIG. 8, the sleeve 70 is made of metal. In particular, the elastic collet 71 must be processed for grooves 73. This causes high cost and is time-consuming. Sometimes, the edges of the grooves 73 have remained iron filings to damage the surface of the pipe 80 during installation.

The elastic collet 71 made of metal is used to clamp the pipe 80. Both the elastic collet 71 and the pipe 80 are made of hard material. When they are contact with each other, the surface of the pipe 80 may have a clamping dent. If the user pulls the pipe 80 carelessly, the elastic collet 71 may scrape the surface of the pipe 80 to leave burrs which may damage the O-shaped ring 62 when retracting the pipe 80. This will cause leakage of compressed air and shorten the service life of the pipe.

The elastic collet made of metal must be processed for the grooves to cause high cost and time waste. The edges of the grooves have remained iron filings to damage the surface of the pipe during installation. Both the elastic collet and the pipe are made of hard material. When they are contact with each other, the surface of the pipe may have a clamping dent to damage the O-shaped ring when retracting the pipe. This will cause leakage of compressed air. Accordingly, the inventor of the present invention has devoted himself based on his many years of practical experiences to solve these problems.

SUMMARY OF THE INVENTION

The primary object of the present invention is to provide a retractable pipe assembly of an air blow gun. The retractable pipe assembly comprises an extension pipe, a lock unit and a blow pipe. The extension pipe comprises a front connecting end and a rear connecting end. The front connecting end and the rear connecting end respectively have threads thereon. The extension pipe has a stepped through hole which has a large diameter part, a small diameter part and a stepped stop between the large diameter part and the small diameter part. The lock unit comprises a lock member, an elastic collet and a seal member. The lock member has a first end and an opposing second end. The first end of the lock member has an inner threaded hole. The second end of the lock member has a through hole which has a diameter smaller than that of the inner threaded hole. The through hole communicates with the inner threaded hole. The elastic collet and the seal member are accommodated in the lock member. The inner threaded hole of the lock member is threadedly connected to the threads of the front connecting end of the extension pipe. One end of the elastic collet has a cone surface. The cone surface has a plurality of slots which are disposed around the cone surface. The blow pipe is inserted in the stepped through hole of the extension pipe. The blow pipe comprises a stop ring screwed to an end of the blow pipe. The stop ring is accommodated in the extension pipe and stopped by the stepped stop.

Preferably, the front connecting end of the extension pipe has an inner inclined surface at an end edge thereof. The inner inclined surface is inclined inward.

Preferably, the extension pipe is further connected with another extension pipe.

The elastic collet of the present invention is made of an engineering plastic material, which is light, can be moved smoothly, can be manufactured easily and quickly, and is cost-effective. The material of the elastic collet is elastic to provide a better tightening force and won't damage the surface of the blow pipe.

DETAILED DESCRIPTION OF THE PREFERRED EMBODIMENTS

Embodiments of the present invention will now be described, by way of example only, with reference to the accompanying drawings.

Figure 1:
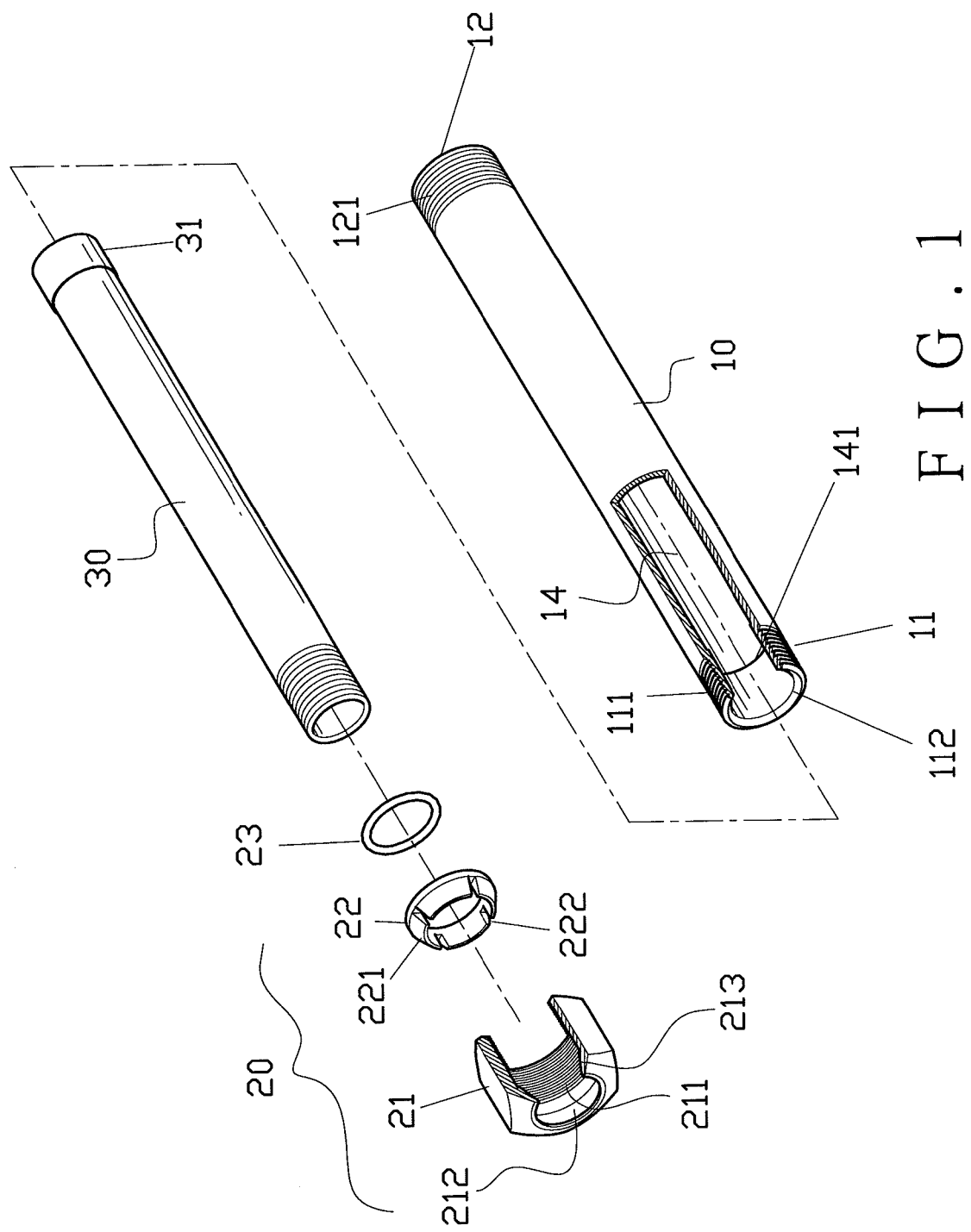
FIG. 1 is an exploded view according to a preferred embodiment of the present invention.
Figure 2:
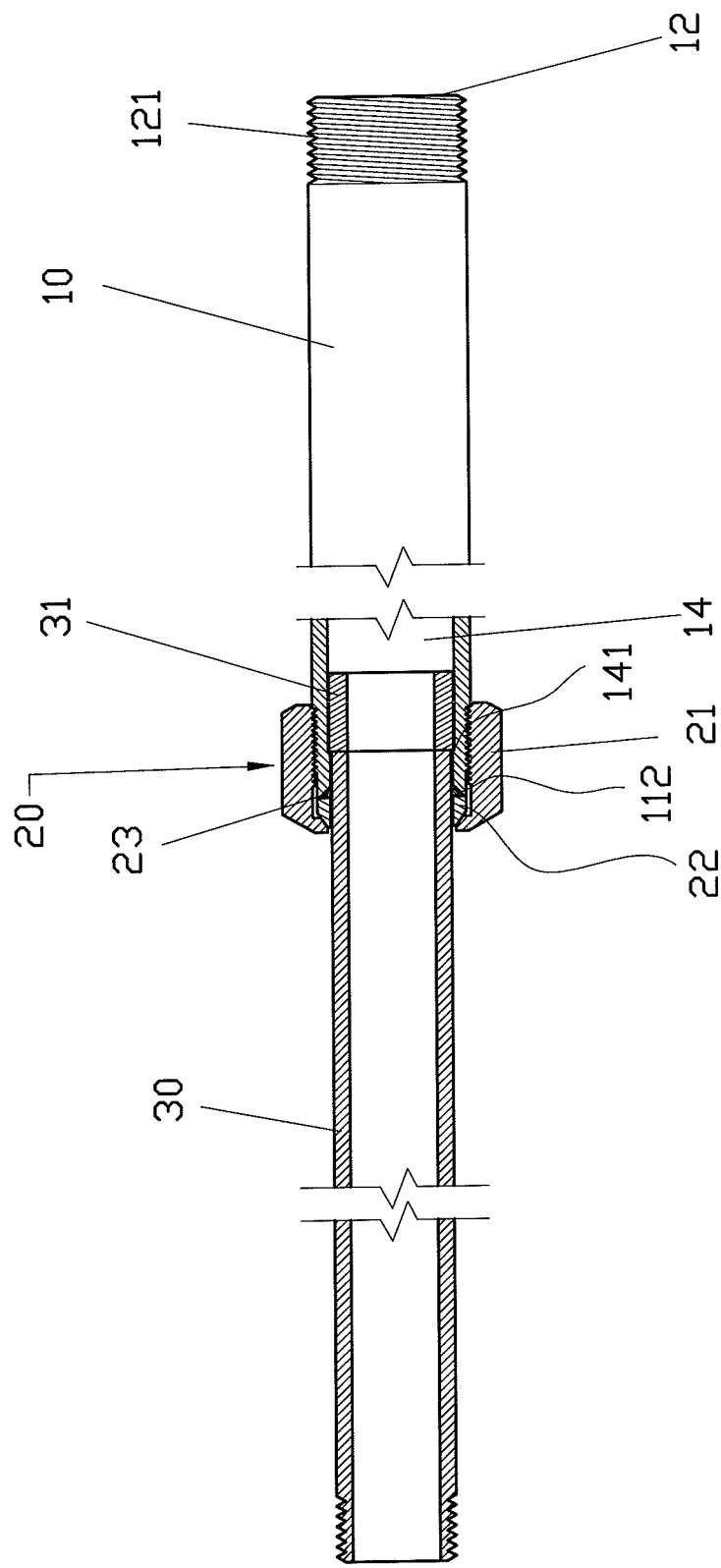
FIG. 2 is a sectional view according to the preferred embodiment of the present invention.
Figure 3:
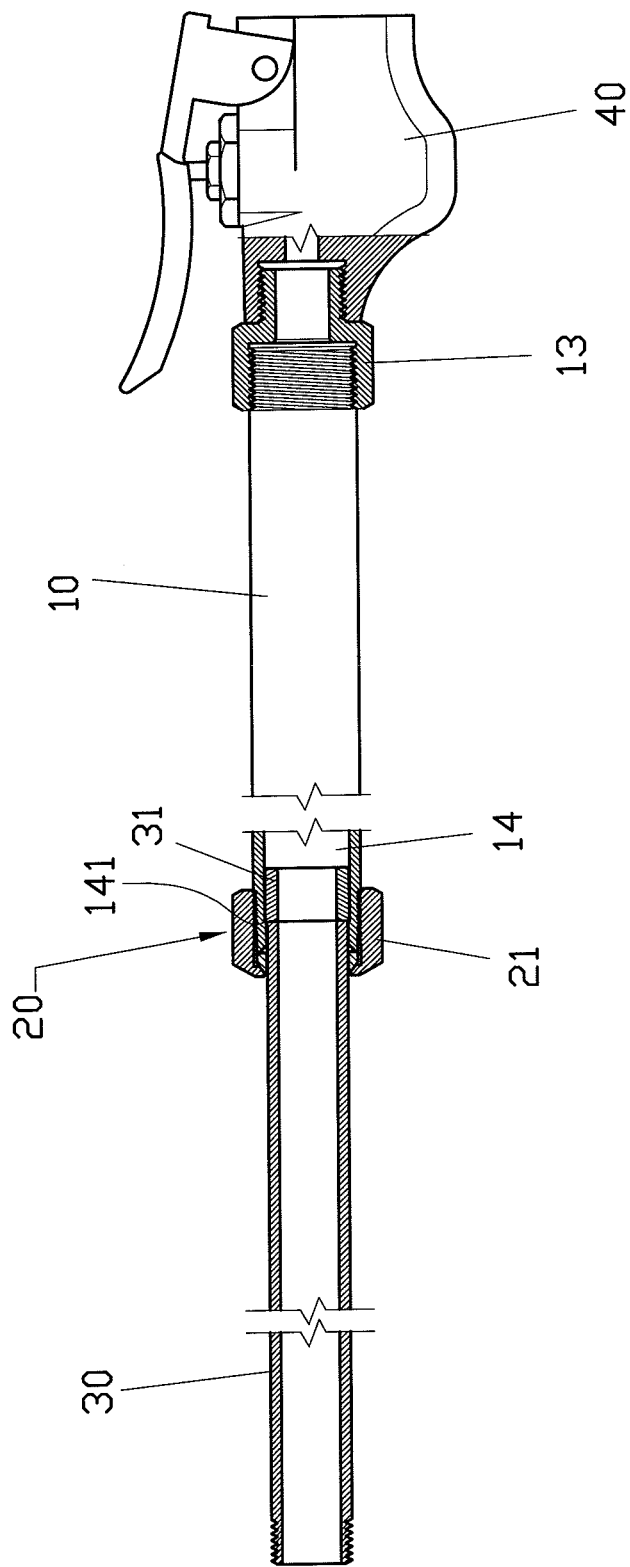
FIG. 3 is a sectional view showing the preferred embodiment of the present invention coupled to an air blow gun.

As shown in FIG. 1 through FIG. 3, the retractable pipe assembly of an air blow gun according to a preferred embodiment of the present invention comprises an extension pipe 10, a lock unit 20, and a blow pipe 30.

The extension pipe 10 comprises a front connecting end 11 and a rear connecting end 12. The front connecting end 11 and the rear connecting end 12 respectively have threads 111, 121 thereon. The rear connecting end 12 is connected with a connector 13 to connect an air blow gun 40. The extension pipe 10 has a stepped through hole 14 which has a large diameter part, a small diameter part and a stepped stop 141 between the large diameter part and the small diameter part. The small diameter part of the stepped through hole 14 is disposed at the front connecting end 11 to support the blow pipe 30. The front connecting end 11 has an inner inclined surface 112 at an end edge thereof. The inner inclined surface 112 is inclined inward.

The lock unit 20 comprises a lock member 21, an elastic collet 22 and a seal member 23. The lock member 21 has a first end and an opposing second end. The first end of the lock member 21 has an inner threaded hole 211. The second end of the lock member 21 has a through hole 212 which has a diameter smaller than that of the inner threaded hole 211. The through hole 212 communicates with the inner threaded hole 211. The elastic collet 22 and the seal member 23 are accommodated in the lock member 21. The inner threaded hole 211 of the lock member 21 is threadedly connected to the threads 111 of the front connecting end 11 of the extension pipe 10. The seal member 23 is located on the inner inclined surface 112 of the extension pipe 10. The second end of the lock member 21 has an inner cone surface 213 therein. One end of the elastic collet 22 has a cone surface 221 corresponding to the inner cone surface 213 of the lock member 21. The cone surface 221 has a plurality of slots 222 which are disposed around the cone surface 221. The cone surface 221 can be deformed to provide a clamp effect.

The blow pipe 30 is inserted in the stepped through hole 14 of the extension pipe 10 and is retractable in the extension pipe 10. The blow pipe 30 comprises a stop ring 31 screwed to an end of the blow pipe 30. The stop ring 31 has a diameter larger than that of the blow pipe 30. The stop ring 31 is accommodated and movable in the large diameter part of the stepped through hole 14 of the extension pipe 10. The stop ring 31 of the blow pipe 30 is confined by the small diameter part of the stepped through hole 14 and stopped by the stepped stop 141, so that the blow pipe 30 will not disengage from the extension pipe 10.

Figure 4:
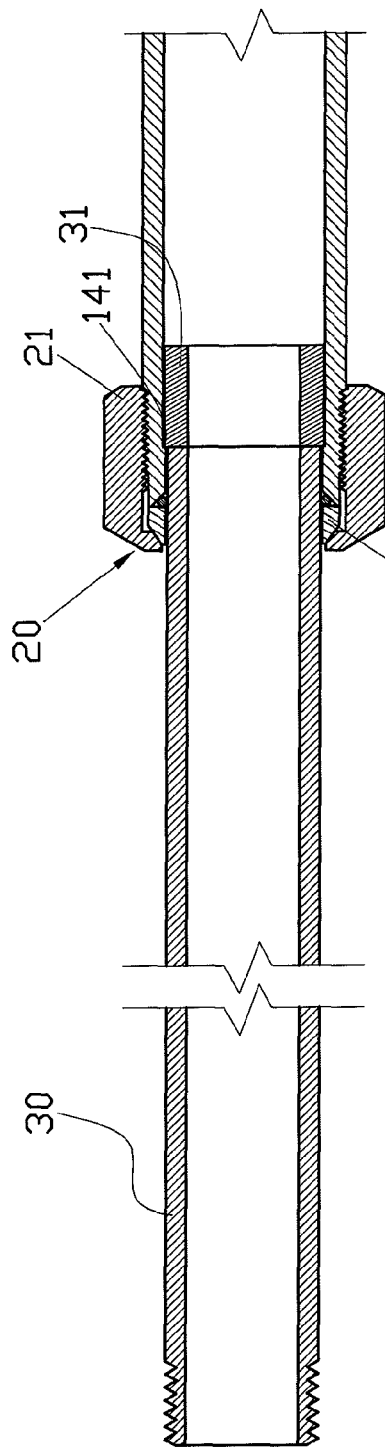
FIG. 4 is a sectional view showing the lock unit locking the blow pipe according to the preferred embodiment of the present invention.
Figure 5:
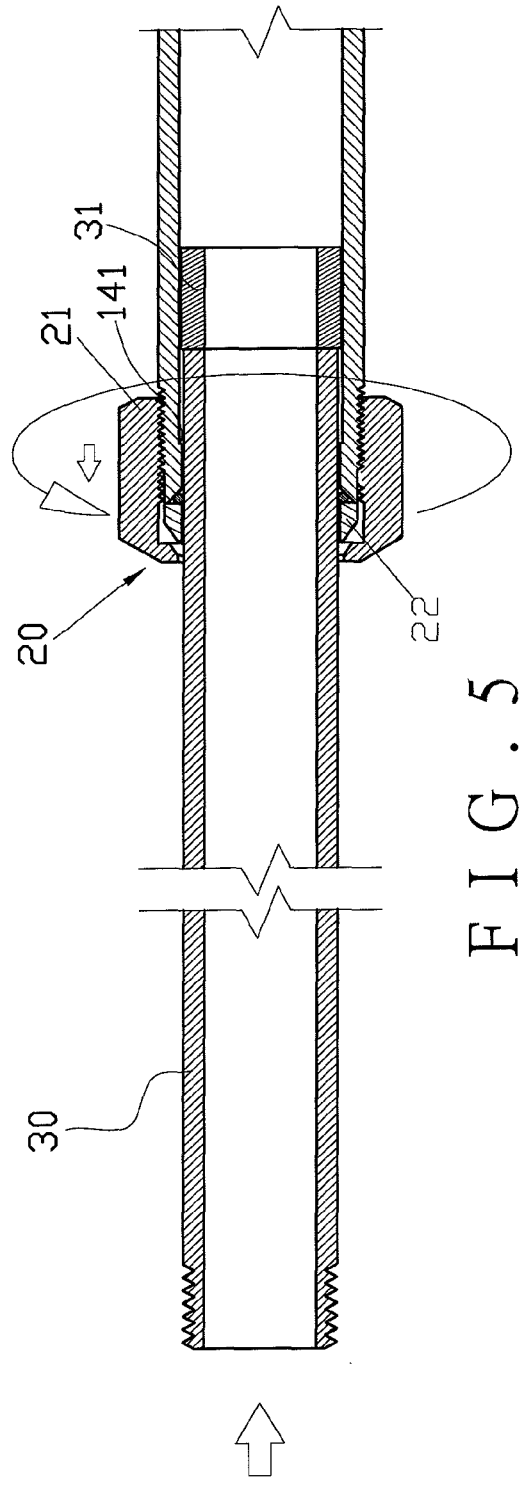
FIG. 5 is a sectional view showing the lock unit releasing the blow pipe according to the preferred embodiment of the present invention.

As shown in FIG. 4 and FIG. 5, the blow pipe 30 is controlled by the lock unit 20 to be secured or adjusted in a stepless way. The lock member 21 can be loosened to disengage from the elastic collet 22, so that the elastic collet 22 is returned to its original state, as shown in FIG. 5. The blow pipe 30 is released from the elastic collet 22, so that the blow pipe 30 can be moved in the extension pipe 10 or turned to a desired angle.

As shown in FIG. 1 through FIG. 4, when the blow pipe 30 is extended to the utmost length, the stop ring 31 is confined and stopped by the stepped stop 141 of the stepped through hole 14, so that the blow pipe 30 won't disengage from the extension pipe 10.

The blow pipe 30 is positioned by screwing the lock member 21. The lock member 21 gradually tightens the elastic collet 22 to hold against the cone surface 221 of the elastic collet 22. The cone surface 221 is gradually deformed to clamp and position the blow pipe 30.

As shown in FIG. 1, the elastic collet 22 is made of an engineering plastic material, which is light, can be moved smoothly, can be manufactured easily and quickly, and is cost-effective. Through the design of the slots 222, the elastic collet 22 can be deformed to clamp the blow pipe 30. The material of the elastic collet 22 is elastic to provide a better tightening force and won't damage the surface of the blow pipe 30.

Referring to FIG. 1 and FIG. 3, the seal member 23 of the lock unit 20 is located between the elastic collet 22 and the inner inclined surface 112 of the extension pipe 10. The seal member 23 of the lock unit 20 is pushed by the elastic collet 22 when screwing the lock member 21 and guided by the inner inclined surface 112 of the extension pipe 10 to be deformed so as to tighten the blow pipe 30 and to seal the extension pipe 10. Thus, the seal member 23 has a seal effect to the blow pipe 30, preventing a leak of compressed air from the lock unit 20.

Figure 6:
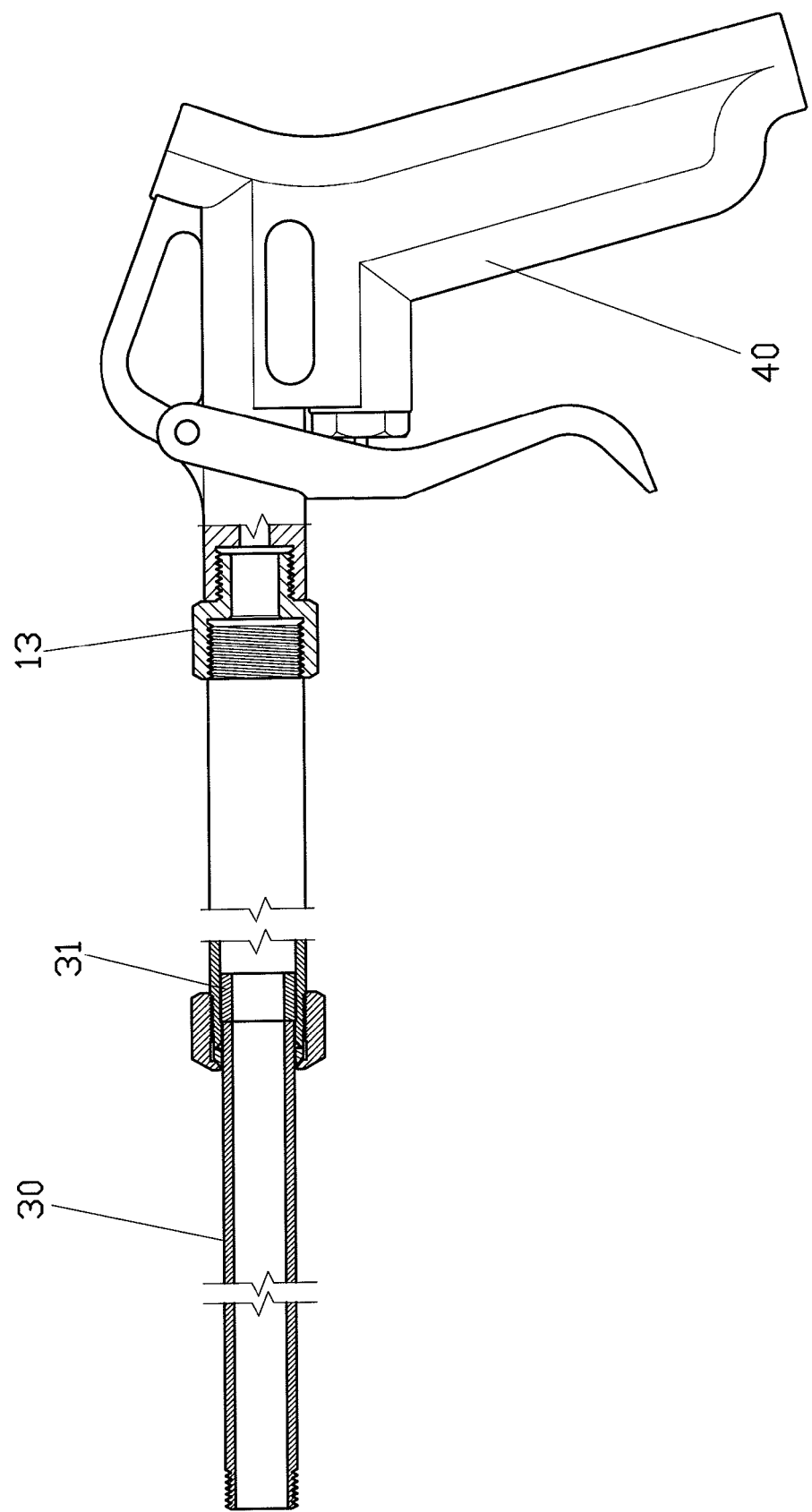
FIG. 6 is a schematic view showing the preferred embodiment of the present invention coupled to another type of air blow gun.

As shown in FIG. 3 and FIG. 6, through the connector 13, the present invention is coupled to an air blow gun 40 which can be in different types for different uses. The blow pipe 30 is retractable in a stepless way, which can be extended to its utmost in order to enter a dangerous location or a narrow seam for spraying compressed air. The present invention can be used conveniently.

Referring to FIG. 1 and FIG. 2, the inner cone surface 213 of the lock member 21 and the cone surface 221 of the elastic collet 22 have the same taper. Through the inner cone surface 213 of the lock member 21 to hold against the cone surface 221 of the elastic collet 22, the elastic collet 22 is gradually compressed to clamp the blow pipe 30. The retraction of the elastic collet 22 can be operated smoothly to clamp the blow pipe 30 tightly, and the elastic collet 22 won't damage the surface of the blow pipe 30.

Figure 7:
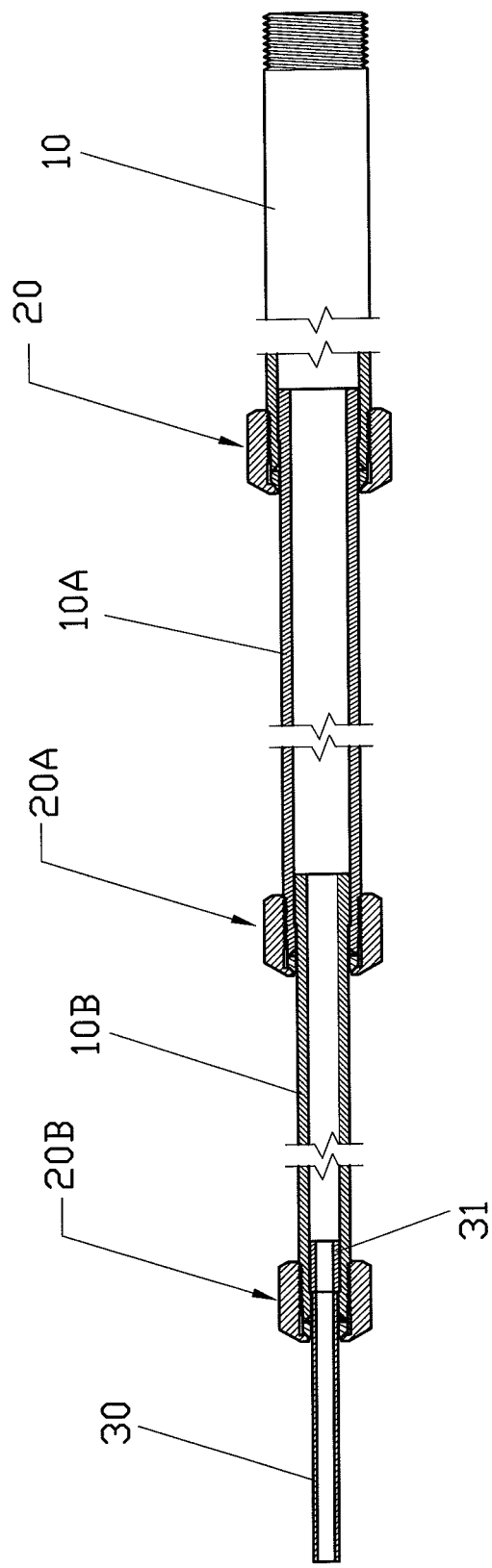
FIG. 7 is a sectional view showing multi-section extension pipe according to another embodiment of the present invention.
Figure 8:
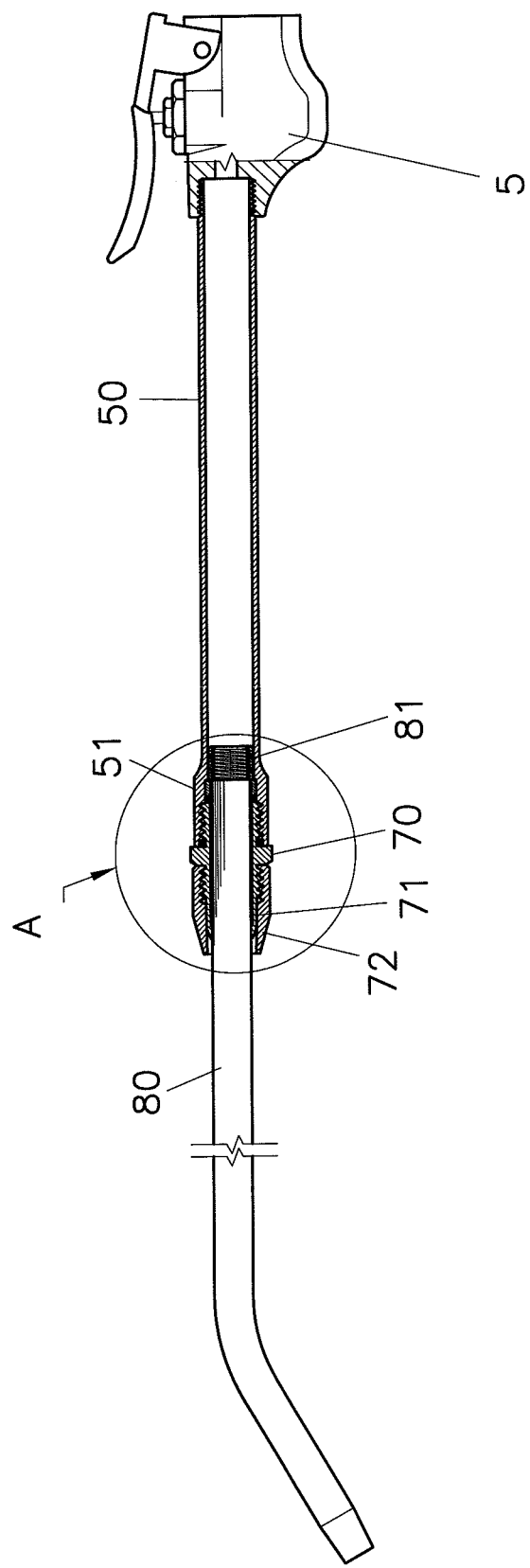
FIG. 8 is a sectional view of a conventional retractable pipe of an air blow gun.
Figure 9:
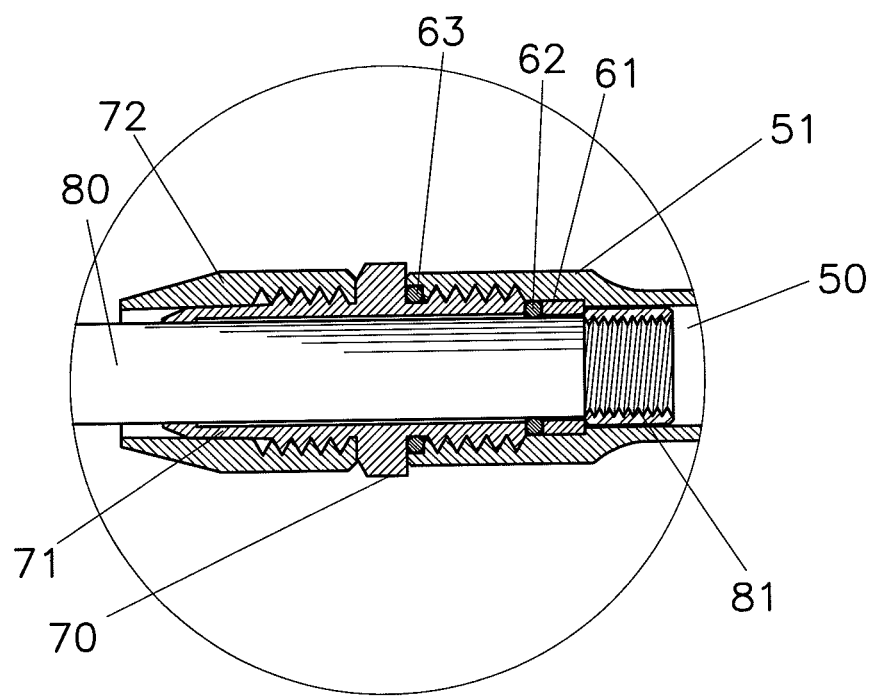
FIG. 9 is an enlarged view taken from circle A of FIG. 8.

Referring to FIG. 7, the present invention comprises a plurality of extension pipes 10 which are connected in series. In this embodiment, there are three connected extension pipes 10, 10A, 10B. The distal end of the extension pipe 10B is connected with the blow pipe 30. The lock unit 20, 20A, 20B are connected between the extension pipes 10, 10A, 10B or between the extension pipe 10B and the blow pipe 30 to form a multi-section extension pipes 10, 10A, 10B to couple with the blow pipe 30, so that the length of the extension pipe 10 can be increased. The blow pipe 30 can reach a further deeper location for a large-scale machine. The extension pipe can be retracted to decrease the spaced occupied.

Accordingly, through adjustment of the lock member of the lock unit of the present invention, the blow pipe of the air blow gun can be adjusted and positioned. The blow pipe is retractable in a stepless way, which can be extended to its utmost in order to enter a dangerous location or a narrow seam for spraying compressed air. The elastic collet is light, can be moved smoothly, can be manufactured easily and quickly, and is cost-effective. The material of the elastic collet is elastic to provide a better tightening force and won't damage the surface of the blow pipe.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A retractable pipe assembly of an air blow gun, comprising:

an extension pipe comprising a front connecting end and a rear connecting end, the front connecting end and the rear connecting end respectively having threads thereon, the front connecting end having an inner inclined surface at an end edge thereof, the extension pipe having a stepped through hole which has a large diameter part, a small diameter part and a stepped stop between the large diameter part and the small diameter part;

a lock unit comprising a lock member, an elastic collet and a deformable seal member, the lock member having a first end and an opposing second end, the first end of the lock member having an inner threaded hole, the second end of the lock member having a through hole which has a diameter smaller than that of the inner threaded hole, the through hole communicating with the inner threaded hole, the elastic collet and the seal member being accommodated in the lock member, the deformable seal member located on the inner inclined surface, the inner threaded hole of the lock member being threadedly connected to the threads of the front connecting end of the extension pipe, one end of the elastic collet having a cone surface, the cone surface having a plurality of slots which are disposed around the cone surface; and a blow pipe inserted in the stepped through hole of the extension pipe, the blow pipe comprising a stop ring screwed to an end of the blow pipe, the stop ring being accommodated in the extension pipe and stopped by the stepped stop.

2. The retractable pipe assembly as claimed in claim 1, wherein the inner inclined surface is inclined inward.

3. The retractable pipe assembly as claimed in claim 1, wherein the extension pipe is further connected with another extension pipe.

4. The retractable pipe assembly as claimed in claim 1, wherein the inner inclined surface and the deformable seal member form an airtight connection.

5. The retractable pipe assembly as claimed in claim 1, wherein the front connecting end and the rear connecting end are integral parts of the extension pipe.

6. The retractable pipe assembly as claimed in claim 1, wherein the lock member extends over the stepped stop.

\* \* \* \* \*